J. C. E. KÖHLER.
HARNESS.
APPLICATION FILED NOV. 13, 1919.

1,392,015. Patented Sept. 27, 1921.
2 SHEETS—SHEET 1.

Witness: Arthur Thompson

Inventor: Johan Cato E. Köhler

UNITED STATES PATENT OFFICE.

JOHAN CATO ELI KÖHLER, OF WOUDZICHT, NEAR VREDE, ORANGE FREE STATE, SOUTH AFRICA.

HARNESS.

1,392,015.  Specification of Letters Patent.  Patented Sept. 27, 1921.

Application filed November 13, 1919. Serial No. 337,698.

*To all whom it may concern:*

Be it known that I, JOHAN CATO ELI KÖHLER, a subject of the Queen of Holland, and resident of Woudzicht, near Vrede, Orange Free State Province, Union of South Africa, have invented a certain new and useful Improvement in Harness, of which the following is a specification.

This invention relates to harness for use with horses and other draft animals.

The object of the invention is to provide a harness which will overcome the difficulties experienced in the use of existing harnesses, the straps or collars of which are generally so positioned as not to admit of the free movement of the shoulders, fore legs and other parts of the body of the horse or other animal besides chafing such parts which move relative to the rest of the body. It is obvious that the full tractive power of the animal will not be developed under these conditions, and my improved harness is designed to admit of the free movement of the animal and the maximum pulling force being exerted, by so arranging the straps, et cetera, that the force will be exerted by the strongest portions of the animal's body, while at the same time insuring that those limbs or parts which move relatively to the rest of the body shall not have straps rubbing against them and chafing them.

The improved harness may be used with slight modifications for either a single animal working alone or for two or more animals abreast or in tandem. It is comparatively light in weight, especially when designed for light work, in which case it consists mainly of straps; chains or other resilient connections taking the place of some or all of the straps when the harness is used for the heavier forms of work.

It is designed so as to embrace and bring into use the greatest effective portion of the animal's body and is arranged to give the animal greater control of the load both when pulling, and, in the heavier class of work, when backing.

It is easily adjusted, quickly put on and very flexible.

The invention is illustrated in a preferred form in the accompanying drawings in which—

Figure 1:
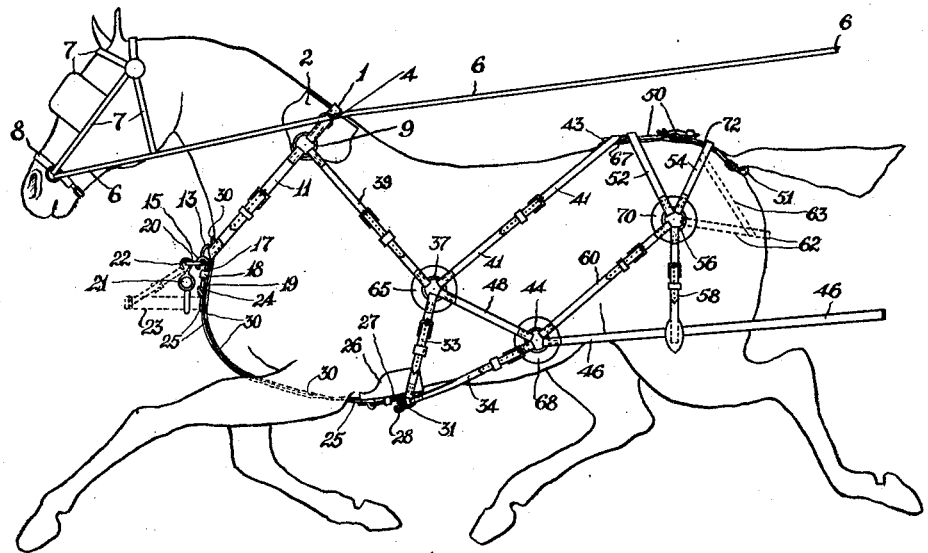
Figure 1 shows a side elevation of one horse equipped with the double harness type of my invention.
Figure 2:
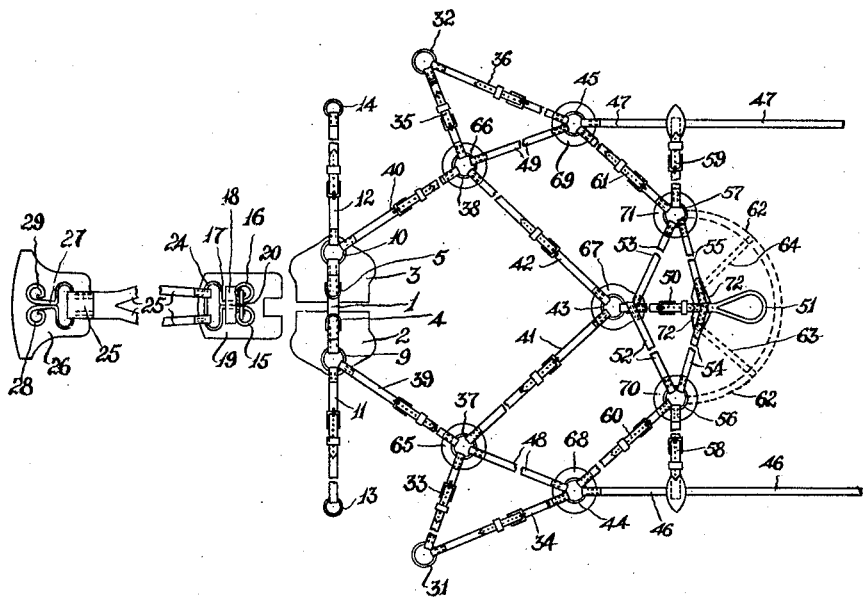
Fig. 2 is a plan view of the type of harness shown in Fig. 1 spread out to elucidate the description thereof.

In Figs. 1 and 2, in which the double harness type of my invention is illustrated, I provide a strap or the like 1 which passes over the lower top portion of the neck of the animal forward of the withers. This strap is suitably fixed on the underside as by sewing or riveting, to a pair of pads or pieces 2, 3, which bear against the sides of the neck at the top. These pads or pieces 2, 3, are spaced apart sufficiently to insure that they shall not cause discomfort to the scruff or upper portion of the animal's neck.

A pair of rings or loops 4, 5, are arranged between the strap 1 and the pads or pieces 2, 3, and are kept hingedly in position on said pads or pieces 2, 3, by the aforesaid strap 1. The rings or loops 4, 5, serve to guide the reins 6 which pass through them and are fixed to the bridle or head piece 7 which may be of any ordinary or suitable construction, the one illustrated in Fig. 1 being of the type in which a nose piece or arch-shaped piece 8, which fits over the nose of the animal, is used instead of the usual bit.

The strap 1 carries, or has attached to it, rings or loops 9, 10, one at either side, to which are secured straps or their equivalent 11, 12, which pass around the neck of the animal and carry further rings 13, 14 which engage in the hooks 15, 16, of a member 17 suitably attached, as by the strip 18, to a chest and underbody strap having at its forward end a pad or piece 19 which rests against the front of the chest of the animal. The hooks 15, 16, of the member 17 are in the form of ram's horns and a ring or loop 20 which embraces part of the members 17 serves, by resting on the hooks 15, 16, over the ends thereof, to prevent accidental disengagement of the rings 13, 14 from said hooks, and also serves as the medium for carrying the cross bar 21 through hook 22 to which cross bar 21 is attached the shaft of the vehicle 23, shown in dotted lines in Fig. 1.

The member 17 is, as shown, looped at its lower end as indicated at 24—see Fig. 2—which loop allows of its attachment to a strap or piece 25. This strap 25 is bifurcated as shown—or it may be formed in two pieces—in its upper portion to adapt it to the shape of the chest or fore part of the animal. This strap or piece 25 is fixed to a pad or piece 26 at its lower end and carries a further member 27 having a pair of hooks 28, 29, of the shape of ram's horns. The strap 25 passes around the chest or fore part of the body and between the fore legs to the underside of the body, a pad of felt 30—see Fig. 1—or the like being preferably placed between the strap 25 and the body to enable the animal to work with greater comfort.

Rings 31, 32 are adapted to be hooked on to the hooks 28, 29, respectively, of member 27. The ring 31 is carried by straps 33, 34, on the one side of the animal and the ring 32 by straps 35, 36, on the other side. The straps 33, 35, depend from and are secured to rings 37, 38 respectively, which rings are in turn secured to and carried by straps 39, 40 (one at either side of the animal), which are attached at their other ends to the rings 9, 10 on the strap 1, and straps 41, 42, (one at either side of the animal) which are secured to a common ring 43 positioned on the rear portion of the back of the animal. The straps 34, 36 are connected to draft rings 44, 45, to which rings the traces 46, 47, or means for attaching the animal to the swingle bars of the vehicle are fixed.

Rings 44 and 37 are connected by means of a strip or strap 48 and rings 45 and 38 are similarly connected by a strip or strap 49. The ring 43 to which the straps 41, 42 are fixed is also connected to a back strap 50 which passes along the rear portion of the back of the animal and has attached to or formed in one piece with it a crupper 51 which passes under and around the tail of the animal. This back strap has attached to it near its junction with the ring 43 a pair of strips or straps 52, 53, and, near its point of attachment to—or where it merges into—the crupper, a further pair of strips or straps 54, 55, the straps 52 and 54 on the one side being attached at their lower ends to a ring or loop 56 and the straps 53 and 55 on the other side to a ring or loop 57.

Rings 56, 57, have fixed to them straps 58, 59 which support and through which pass the traces 46, 47, respectively, and these rings are also connected by means of the straps 60, 61 to the rings 44, 45, to which the traces are attached and through the medium of which the tractive power is applied.

If desired, or if it is necessary that the vehicle in connection with which the harness is used should be backed a further strap or breeching, such as is shown in dotted lines at 62 in Figs. 1 and 2, could be utilized. This strap would be attached at one end to the ring 56 and pass around the buttocks of the animal being secured at the other side to the ring 57. Strips or straps 63, 64 fixed to and depending from straps 54 and 55, and attached at their lower ends to strap 62 would serve to keep said strap 62 in its correct relative position.

The straps 11, 12, 33, 34, 35, 36, 39, 40, 41, 42, 50, 58, 59, 60 and 61 are each double straps and are made adjustable or provided with a buckle and runner or runners to enable the harness to be adapted for use with different sizes of animals or to compensate for stretch in the straps. If, however, the harness is made to suit any particular animal it will be understood that provision for adjustment would not be necessary. Single straps could of course be used and made adjustable, or, as before mentioned, chains or other flexible connections either bare or suitably sheathed or incased might take the place of the straps.

The rings 37, 38, 43, 44, 45, 56, and 57 are each connected through the medium of one or more of the various straps with a suitable pad or piece 65, 66, 67, 68, 69, 70 and 71, respectively, which is positioned beneath the rings and serves to prevent contact of the rings, and the various straps at their points of fixing thereto, with the body of the animal.

72 is a pad or piece fixed beneath the junction of the straps 50, 54 and 55 to prevent chafing of the animal's back.

To unharness the animal it is only necessary, after uncoupling the traces from the swingle bar, to unhook rings 13, and 14 from the hooks 15, 16 and rings 31, 32 from the hooks 28, 29 when the harness can be lifted off the animal.

It will be evident that the harness hereinbefore described can be modified with a very slight addition to suit single harness conditions, the only additional part necessary being a back piece or saddle as is ordinarily used for carrying or taking the weight of the shafts of the vehicle, and to which said shafts are suitably connected. A suitable saddle for heavy work which is generally used in connection with two-wheeled vehicles will be described in connection with Fig. 3 of the drawings.

On reference to the drawings it will be clearly understood that the tractive effort or power of the animal is applied to the traces 46, 47 through the medium of the rings 44, 45; all the power which the animal is able to exert in a forward direction being transmitted by and through that part of the body which is embraced by the neck straps 11, 12, chest strap 25 and side straps 34, 36, 39, 40, 48 and 49 to the traces 46, 47, through said rings 44 and 45.

Figure 3:
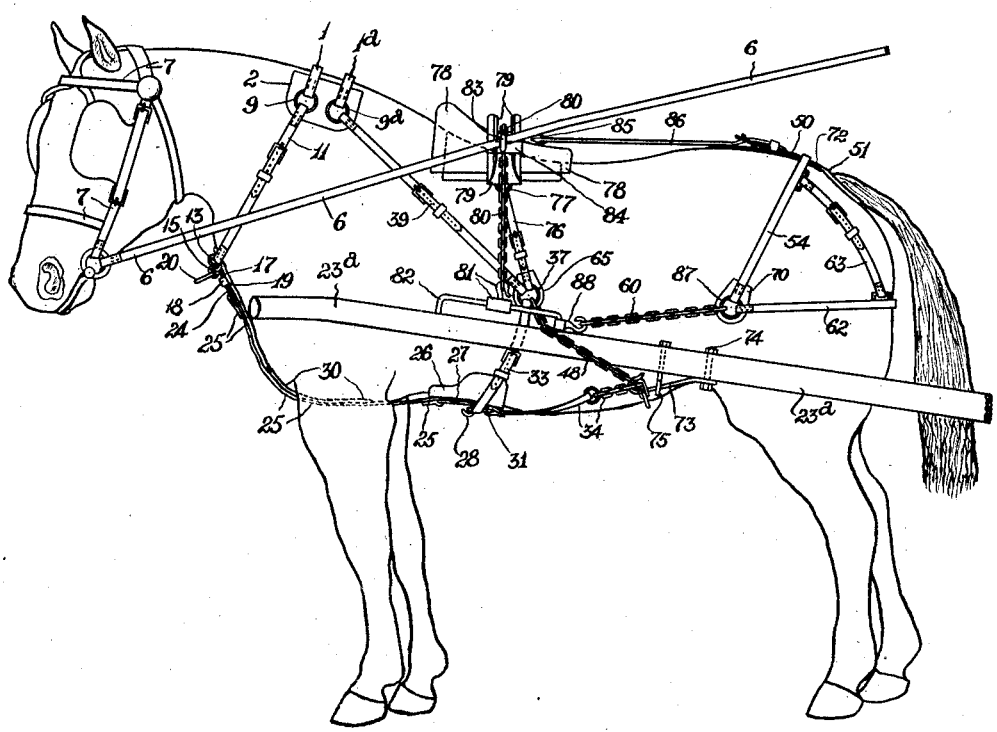
Fig. 3 shows a side elevation of a horse equipped with a form of the invention used as single harness for heavy draft work.

In the modification of the invention illustrated in Fig. 3 in which the invention is shown used as single harness like parts will be denoted by the same numerals as in the description of the type of the invention illustrated in Figs. 1 and 2.

In this form of harness I prefer to provide two straps or pieces 1, 1ª instead of the one used in the previously described construction, the straps 11, 12 being connected with straps 1.

Member 17, chest strap 25, pad 26 and member 27 are constructed and arranged in identically the same manner as before described.

The traces are dispensed with in this form of the invention and instead of straps 34 and 36 being attached to rings to which the traces are connected, they are attached to draft hooks or the like, 73 arranged one on either side of the vehicle. The straps in this case are connected to chains at their one end, the links of the chains allowing of adjustment of the length of the combined strap and chain as shown.

The draft hooks 73 are attached to the shafts 23ª of the vehicle by means of bolts or the like 74; eyebolts 75 through which said hooks pass serving to keep them forwardly directed.

Chains are substituted for the strips or straps 48, 49, and the rings 37, 38, instead of being carried by the forward side straps 39, 40, and rear side straps 41, 42, are carried by the forward side straps 39, 40, (which are attached to the rings 9ª on strap 1ª) and further straps 76 attached by means of rings 77 to and depending from a saddle or the like 78 of ordinary construction which serves to support the shafts 23ª of the vehicle.

The saddle 78, is, as usual, constructed with an arcuate channel or groove 79 which serves to accommodate the chain or the like 80 to which the shafts 23ª are connected through the medium of the slidable hook-shaped members 81 which are slidably attached to the rod or members 82 fixed to the shafts 23ª in the known manner. 83 are eye-pieces fixed to the channel member of the saddle through the medium of pieces 84, which eye-pieces serve as guides for the reins. A further eye-piece or loop 85 is arranged at the back of the saddle to which is attached a back strap or its equivalent 86 which at its other end is connected to the strap 50 and crupper 51.

87 are rings equivalent to rings 56 and 57; the chain equivalent of straps 60, 61 being attached to said rings 87 at one end and to the rods or members 82 on the shafts 23ª at the other end through the medium of hooks 88. Straps 52, 53 are dispensed with the breeching piece 62 being adjustably attached, as shown, to the straps 54, 55 by the straps 63, 64. The breeching in this case is shown well up across the buttocks so as to allow the animal to exert a maximum amount of power when backing a loaded vehicle.

What I claim as my invention and desire to protect by Letters Patent is:—

1. A harness for draft animals comprising neck portions adapted to bear against the sides of the lower top portion of the neck of an animal forward of the withers and extend along the sides of the neck to the forward part of the chest, a chest and underbody strap secured to the lower part of said neck portion and adapted to extend between the forelegs and under the body, means adapted to receive connections from the vehicle and means interconnecting the receiving means, the rear portion of said chest and underbody strap, and the upper part of said neck portion.

2. A harness for draft animals comprising neck portions adapted to bear against the sides of the lower top portion of the neck of an animal forward of the withers and extend along the sides of the neck to the forward part of the chest, a chest and underbody strap secured to the lower part of said neck portion and adapted to extend between the forelegs and under the body, means adapted to receive connections from the vehicle, means connecting said receiving means with the rear portion of said chest and underbody strap, means connecting said receiving means with the upper part of said neck portion, and means connecting the rear portion of said chest and underbody strap with an intermediate portion of the last mentioned means to effect a lifting stress on the underbody.

3. Harness for use with horses and other draft animals including a part which fits the back of the neck of the animal, straps connected with said neck part which pass down opposite sides of the neck, a chest and underbody strap to one end of which said side neck straps are connected and which passes down the front of the animal's chest and between its forelegs to beneath its body, draft means for connecting the harness to the traces, straps connecting said draft means to the other and lower end of the chest strap, connecting pieces, and straps connecting said connecting pieces with the neck strap, the draft means and the other and lower end of the chest strap.

4. Harness for use with horses and other draft animals including a part which fits the back of the neck of the animal, adjustable straps connected with said neck part which pass down opposite sides of the neck, a chest and underbody strap to one end of which said side neck straps are connected and which passes down the front of the animal's chest and between the forelegs to beneath its body, draft means for connecting the harness to the traces, adjustable straps connecting said draft means to the other and lower end of the chest and underbody strap, connecting pieces, and adjustable straps connecting said connecting pieces with the neck strap, the draft means and with the other and lower end of the chest strap.

5. Harness for use with horses and other draft animals including a part which fits the back of the neck of the animal, straps connected with said neck part which pass down opposite sides of the neck, a chest strap to one end of which said side neck straps are connected and which passes down the front of the animal's chest and between its forelegs to beneath its body, draft means for connecting the harness to the vehicle, straps connecting said draft means to the other and lower end of the chest strap, connecting pieces, further straps connecting said connecting pieces with the neck strap, other straps connecting said connecting pieces with the draft means and other straps connecting said connecting pieces with the other and lower end of the chest strap, a back strap, straps for connecting said back strap to the connecting pieces, a crupper attached to said back strap, a pair of straps fixed to the fore parts of the back strap at one end and passing down opposite sides of the animal, a further pair of straps fixed to the back portion of said back strap at one end and passing down opposite side of the animal and connected with the first mentioned pair at the other or lower ends, and straps connecting said last mentioned two pairs of straps with the draft means.

6. Harness for use with horses and other draft animals including a part which fits the back of the neck of the animal, straps connected with said neck part which pass down opposite sides of the neck, a chest strap to one end of which said side neck straps are connected and which passes down the front of the animal's chest and between its forelegs to beneath its body, draft means for connecting the harness to the vehicle, straps connecting said draft means to the other and lower end of the chest strap, connecting pieces, further straps connecting said connecting pieces with the neck strap, other straps connecting said connecting pieces with the draft means and other straps connecting said connecting pieces with the other and lower end of the chest strap, a back strap, straps for connecting said back strap to the connecting pieces, a crupper attached to said back strap, a pair of straps fixed to the fore parts of the back strap at one end and passing down opposite sides of the animal, a further pair of straps fixed to the back portion of said back strap at one end and passing down opposite side of the animal and connected with the first mentioned pair, at the other or lower ends, and straps connecting said last mentioned two pairs of straps with the draft means, a breeching piece attached to the other or lower ends of the two pairs of straps and straps connecting the breeching piece with the last mentioned pair of straps intermediate their ends.

7. A harness for draft animals comprising a neck portion, a chest and underbody strap secured thereto, and adapted to extend between the forelegs to beneath the body, traces, means adapted to receive said traces, means connecting said receiving means with the rear portion of said chest and underbody strap and with the upper part of said neck portion, means adapted to extend from said receiving means over the extreme rear of the animal's back, and means connecting said latter means with the traces to the rear of the said receiving means, said parts being so proportioned that the draft is at all times distributed on all said parts in contact with the animal.

8. A harness for draft animals comprising a neck portion, a chest and underbody strap secured thereto and adapted to extend between the forelegs to beneath the body, means adapted to receive connections from a vehicle, means connecting said receiving means with the rear portion of the chest and underbody strap and with the upper part of said neck portion, means adapted to extend from said receiving means over the extreme rear of the animal's back, means adapted to extend from a portion of the connection between the receiving means and the neck portion over the rear of the animal's back, and means for connecting the rear portions of the last two parts.

In testimony whereof I have signed my name to this specification in the presence of two subscribing witnesses.

JOHAN CATO ELI KÖHLER.

Witnesses:
 CHAS. OVENDALE,
 ARTHUR THOMPSON.